W. H. BROWN.
SPRING LUBRICATOR.
APPLICATION FILED MAR. 30, 1914.
1,215,904.
Patented Feb. 13, 1917.
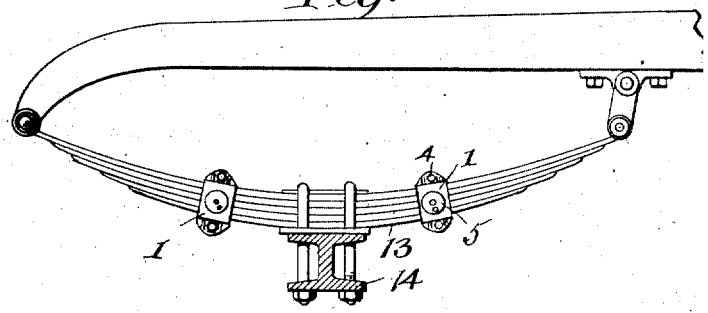
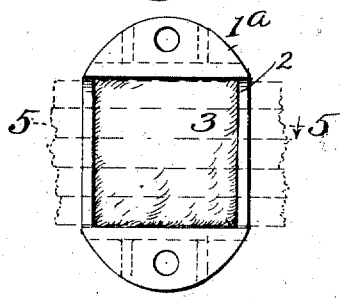
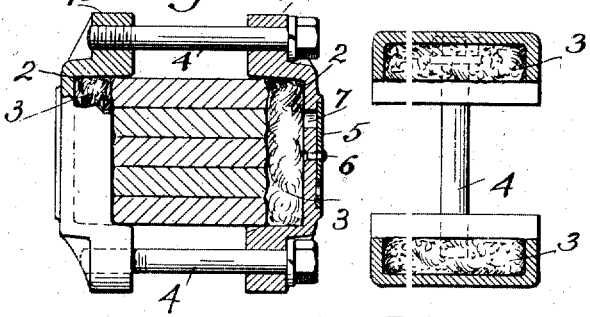

UNITED STATES PATENT OFFICE.

WILLIAM H. BROWN, OF CLEVELAND, OHIO.

SPRING-LUBRICATOR.

1,215,904.  Specification of Letters Patent.  Patented Feb. 13, 1917.

Application filed March 30, 1914.  Serial No. 828,137.

*To all whom it may concern:*

Be it known that I, WILLIAM H. BROWN, a citizen of the United States, residing at Cleveland, in the county of Cuyahoga and State of Ohio, have invented a certain new and useful Improvement in Spring-Lubricators, of which the following is a full, clear, and exact description.

This invention relates to a device for lubricating the contacting surfaces between the leaves of a spring.

The object of the invention is to provide a device which is simple in construction, and one that may easily be mounted upon the spring; one which will efficiently provide lubricant, and at the same time be comparatively cheap from the standpoint of construction.

Generally speaking, the invention comprises the elements and combinations thereof set forth in the accompanying claims.

Reference should be had to the accompanying drawings forming a part of this specification, in which Figure 1 shows a side elevation of an automobile spring with two lubricating devices mounted thereon; Fig. 2 is an elevation showing the inside of one part of the lubricator casing; Fig. 3 is a vertical section through the casing and spring; Fig. 4 is a section on the line 5—5 of Fig. 3.

That the efficiency of a spring is very greatly increased by keeping the same in well lubricated condition is now generally accepted by all persons connected in any way with the upkeep of vehicle springs. There have been many devices proposed for the lubrication of the spring, but it is my purpose in the device proposed in this application, to supply lubricant at the portion of the spring where it will do the most good.

As is well known, the usual vehicle spring is composed of a number of flat leaves which are firmly and tightly bound together. If a lubricant be presented to the edges of the leaves of the spring, the lubricant will by capillary action be drawn between adjacent leaves of the spring, and this capillary action is greatly magnified by the relative movement between the adjacent leaves when the spring is flexed. Furthermore, the movement of the leaves will also to a certain extent mechanically cause the distribution of the lubricant. I wish to clearly distinguish this proposition from certain prior art devices in which a pad impregnated with oil is secured upon the top of the spring. My device is distinguished from such devices in that lubricant is continuously presented to the edges of the engaging surfaces of adjacent leaves of the spring.

As shown in Figs. 3 and 4, one form of my device comprises a casing which may generally be represented at 1, made up of the two parts 1ª and 1ᵇ. Each part is provided with a recessed portion 2, in which is placed a source of lubricant, which in the instance shown is a pad 3, which is saturated with lubricant. In placing the casing upon the spring, the parts are placed upon opposite sides of the spring so that the pads are bearing against the edges or sides of the spring leaves. The pads 3 are somewhat resilient, so that they bear against the edges of the spring leaves, and they are always in position to feed lubricant to the engaging surfaces between the leaves of the spring, as they move with respect to each other.

The two parts 1ª and 1ᵇ are held together by means of screw bolts 4, as indicated in the drawing. The recessed portion 2 of each part of the casing is such as to closely fit around the portion of the spring with which it engages, thereby preventing the escape, from the casing of any lubricant along the spring, except such as is introduced between the leaves of the spring.

For the purpose of introducing oil into the recessed portions 2, I have provided a cap 5 pivotally mounted upon a pin 6. This cap may be turned and in so doing, exposes openings 7, so that the nose of an oil can may be introduced through the opening 7 and oil supplied.

A feature of peculiar importance in my device is that, while the vehicle is in service and moving, at which time the oil is required, the fibrous pad is being continually agitated and the oil particles kept, therefore, in a state of unrest. This agitation is not the result of merely rubbing the fibers along an uneven surface. It is due to a variation in the pressure between the fibers. This is produced by play of the spring leaves, which action is peculiarly effective in insuring proper feed of the oil. The flexing of the spring causes each leaf to slide lengthwise along the adjacent ones. This action is well known. But there is another motion of the leaves. The leaves spread fanlike.

This is due to the side sway of the vehicle and the necessary manufacturing imperfection of the uniformity in thickness and temper as well as surface finish of the spring leaves. The leaves also slightly separate and are again squeezed together so that the leaves constantly change the pressure between the fiber particles and keep the oil particles on the move during the whole time the vehicle is in actual use.

Another feature of importance in my device lies in the fact that I hold the pad against the spring by means of the same fastening devices that clamp the casing thereto, and, by having the casing take up practically all the thrust of this clamping action, I relieve the pad of excess pressure, thereby insuring the proper degree of pad pressure against the leaves of the spring to bring about the best distribution of the lubricant. By thus arranging the devices that the pad-holding device shall take up the thrust of the clamping or anchoring means, I get the further very important practical result that my device is rendered fool-proof, in that no matter how tightly the clamping bolts are drawn up the pad will be held against the spring with the desired predetermined pressure and no greater pressure.

Having thus described my invention, what I claim is:

1. A lubricating device for that type of spring comprising a plurality of superimposed leaves, consisting of a yielding lubricant-holding pad having capillary capacity and adapted to extend across the joints between the leaves, and means for holding said pad pressed against the edges of said leaves with sufficient pressure to cause the movement of the leaves in use to agitate the fibers of the pad, said means embodying a rigid member bearing against and covering the outer face of the pad, and devices for clamping said rigid member against the spring whereby said rigid member is caused to take up the thrust due to the clamping action and thereby prevent excessive pressure on the pad.

2. In combination with a spring comprising a plurality of superimposed leaves, a lubricating appliance therefor comprising a pair of lubricating-pad-holding parts arranged at opposite sides of the spring in such manner that the pads will bear against the edges of the spring, and holding means for said parts which are common to both parts, whereby each part will form in effect a portion of the holding means of the other part.

3. In combination with a spring composed of a plurality of superimposed leaves, a lubricating appliance therefor comprising a pair of parts arranged at opposite sides of the springs, pads held against the edges of the springs by said parts, a holding member connecting the upper ends of the parts extending across the top of the spring and another holding member connecting the lower ends of the parts extending underneath the spring, whereby each of the pad-holding parts forms a portion of the holding means of the other pad-holding part.

4. In combination with a spring composed of a plurality of superimposed leaves, a lubricating appliance composed of a pair of parts arranged at opposite sides of the spring and projecting above and below the same, a lubricating pad held against the edges of the leaves by each part, a rigid holding member extending across the top of the spring and connecting the upper ends of said parts, and another rigid holding member connecting the lower ends of said parts and extending underneath the spring, whereby each pad-holding part forms in effect a portion of the holding means of the other pad-holding part.

5. A lubricating device for that type of spring comprising a plurality of superimposed leaves, consisting of a pair of yielding lubricant-holding pads having capillary capacity and adapted to extend across the joints between the leaves, and means for holding said pads pressed against the opposite edges of said leaves with sufficient pressure to cause a movement of the leaves in use to agitate the fibers of the pad, said means embodying a pair of rigid parts bearing against and covering the outer faces of the respective pads and common devices for clamping said rigid parts against the spring, whereby said rigid parts are caused to take up the thrust due to the clamping action and thereby prevent excessive pressure on the pads, and whereby also each of said parts forms in effect a portion of the fastening means on the other part.

In testimony whereof, I hereunto affix my signature in the presence of two witnesses.

WILLIAM H. BROWN.

Witnesses:
 A. J. HUDSON,
 L. I. PORTER.